United States Patent [19]

Schubert

[11] Patent Number: 5,785,939
[45] Date of Patent: *Jul. 28, 1998

[54] METHOD FOR PRODUCING CALCIUM BORATE

[75] Inventor: David M. Schubert, Los Angeles, Calif.

[73] Assignee: U.S. Borax Inc., Valencia, Calif.

[*] Notice: The term of this patent shall not extend beyond the expiration date of Pat. No. 5,688,481.

[21] Appl. No.: 844,481

[22] Filed: Apr. 18, 1997

Related U.S. Application Data

[63] Continuation-in-part of Ser. No. 544,518, Oct. 18, 1995, Pat. No. 5,688,481.

[51] Int. Cl.⁶ .................................................. C01B 35/12
[52] U.S. Cl. .............................................. 423/279; 423/280
[58] Field of Search .......................................... 423/279, 280

[56] References Cited

U.S. PATENT DOCUMENTS

| | | |
|---|---|---|
| 3,032,391 | 5/1962 | Ball et al. . |
| 3,032,392 | 5/1962 | Nies et al. . |
| 3,337,292 | 8/1967 | Wieder et al. . |
| 3,337,293 | 8/1967 | Wieder et al. . |
| 4,179,493 | 12/1979 | Sadan ........................ 423/279 |
| 4,233,051 | 11/1980 | Eastes . |
| 4,683,126 | 7/1987 | Inoue et al. ................ 423/280 |
| 5,688,481 | 11/1997 | Schubert ................... 423/279 |

FOREIGN PATENT DOCUMENTS

| | | | |
|---|---|---|---|
| 71300 | 6/1976 | Japan | 423/279 |
| 27923 | 2/1982 | Japan | 423/279 |
| 1321678 | 7/1987 | U.S.S.R. . | |
| 1754656 | 8/1992 | U.S.S.R. . | |

OTHER PUBLICATIONS

Ditte, Production par voie seche de quelques borates crystallises, Acad. Sci. Paris Comptes rendus, vol. 77, pp.783–785 (1873) (with translation). (no month available).

Erd et al., Nobleite, Another New Hydrous Calcium Borate From the Death Valley Region, Calif., American Minerologist, vol. 46, pp. 560–571 (1961). (no month available).

Lehmann et al., "Uber Bildungs und Existenzbedingungen von Gowerit, $CaB_6O_{10}\cdot5\ H_2O$, und Nobleit, $CaB_6O_{10}\cdot4\ H_2O$, sowie ihre, Umwandlung in $Ca_3B_{20}O_{33}\cdot12\ H_2O$" Zeitschrift fur Anorganische und Allgemeine Chemie, Band 346, pp. 12–20 (1966). (no month available).

Lehman, et al., Chemical Abstracts vol. 65, 14808 (1966). (no month available).

Kemp, "The Chemistry of Borates", 1956, pp. 68–71, Borax Consolidated Limited, London, S.W.1. (no month available).

Mellor, Supplement to Mellor's Comprehensive Treatise on Inorganic and Theoretical Chemistry, vol. V, Part A, pp. 550–551 (1980). (no month available).

Meyerhoffer et al., Liebig's Ann., 351, pp. 100–107 (1907) (no available).

Meyerhoffer et al., Chemical Abstracts, vol. 1, 1236 (1907) (no month available).

Van't Hoff, J. H. (1907), Untersuchungen uber die Bildung der ozeanischen Salzablagerungen. LI. Borocalcit und die kunstliche Darstellung von Ascharit: Sitzungsber. Konigl. preuss Akad. Wiss. 1907, 652–654. (no month available).

Van't Hoff, Chemical Abstracts, vol. 1, 2864 (1907) (no month available).

SBORGI, UMBERTO (1913), Sistema $CaO\text{-}B_2O_3\text{-}H_2O$ a 30°: Atti. Accad. Lincei, 5th ser., 22, pp. 636–642, 715–719, 798–801. (no month available).

Sborgi, Chemical Abstracts, vol. 7, 3092 (1913), (no month available).

Nikolaev, A. V. and Chelischeva, A. G. (1940), The 25°isotherm of the systems: $CaO+B_2O_3+H_2O$ and $MgO+B_2O_3+H_2O$: Comptes rendus (Doklady) Acad. Sci. U.S.S.R., 28, 127–130. (no month available).

Lehmann et al., Uberdie Hydratedes Calcium (1:1) borates $Ca(BO_2)_2\cdot6H_2O$ und $Ca(BO_2)_2\cdot4H_2O$, Zeitschriftfur Anorganische und Allgemeine Chemie, Band 320, pp. 255–260 (1963). (no month available).

*Primary Examiner*—Wayne Langel
*Attorney, Agent, or Firm*—James R. Thornton

[57] ABSTRACT

An improved method is provided for producing crystalline calcium hexaborate tetrahydrate, synthetic nobleite, by the reaction of boric acid and lime in an aqueous slurry. Reaction conditions include boric acid to water molar ratios of greater than 0.25:1, lime to boric acid molar ratios in the range of 0.05–0.15:1 and temperatures in the range of 60°–85° C. A concentration of at least 25% by weight undissolved solids is in the aqueous product slurry.

13 Claims, No Drawings

METHOD FOR PRODUCING CALCIUM BORATE

This application is a continuation-in-part of my copending application Ser. No. 08/544,518 filed Oct. 18, 1995, now U.S. Pat. No. 5,688,481. This invention relates to a method for the production of calcium borate and more particularly to an improved method for producing crystalline calcium hexaborate tetrahydrate, a synthetic form of the mineral nobleite, by the reaction of boric acid and lime in an aqueous slurry.

BACKGROUND OF THE INVENTION

Calcium borates have many industrial applications. They are used as a source of boron in fiberglass manufacture when the desired glass composition requires that sodium addition be limited, such as for textile fiberglass. They are also useful as fire retardant agents in such materials as plastics and rubber polymers, cellulosics, resins and oils, etc. Further, they are useful in the manufacture of steel and ceramics.

Many different calcium borate compositions are known, both natural and synthetic; they are most commonly formed as hydrated compounds. Naturally occurring calcium borates which are commonly used commercially include colemanite, which has the chemical composition $2CaO \cdot 3B_2O_3 \cdot 5H_2O$, and ulexite, a mixed sodium-calcium borate of the composition $Na_2O \cdot 2CaO \cdot 5B_2O_3 \cdot 16H_2O$. Disadvantages of these naturally occurring calcium borate minerals include the presence of mineral impurities, the need for fine grinding when very fine particle sizes are needed, such as to achieve fine dispersions in polymeric resins for fire retardant applications, and in the case of ulexite, the presence of sodium and substantial water content. The borate contents of colemanite and ulexite are about 51% $B_2O_3$ and 43% $B_2O_3$, respectively.

Known synthetic calcium borates include the tetrahydrate and hexahydrate forms of calcium metaborate, $CaO \cdot B_2O_3 \cdot 4H_2O$ and $CaO \cdot B_2O_3 \cdot 6H_2O$, which contain about 35% and 30% $B_2O_3$, respectively. Although these synthetic compositions have the potential of being of higher purity, since they lack the mineral impurities found in naturally occurring colemanite and ulexite, they are relatively low in borate content by comparison. Synthetic gowerite, consisting of calcium hexaborate pentahydrate ($CaO \cdot 3B_2O_3 \cdot 5H_2O$), contains about 59% $B_2O_3$, which is substantially higher in borate content than the calcium metaborate compositions. However, gowerite tends to crystallize in a coarse, granular form, thus requiring grinding to achieve the fine particle sizes needed for many applications.

Calcium hexaborate tetrahydrate, which has the formula $CaO \cdot 3B_2O_3 \cdot 4H_2O$, has the same ratio of boron to calcium as synthetic gowerite, but contains less water. At 62% $B_2O_3$ it has a higher borate content than gowerite, the calcium metaborates and the minerals colemanite and ulexite. It is known to occur in nature as the mineral nobleite, although it is not found in commercially exploitable quantities.

Various methods for producing synthetic forms of the minerals nobleite and gowerite are known. For example synthetic nobleite can be produced by the hydrothermal treatment of meyerhofferite ($2CaO \cdot 3B_2O_3 \cdot 7H_2O$) in boric acid solution for 8 days at 85° C. See U.S. Pat. No. 3,337,292.

Ditte, Acad. Sci. Paris Coptes rendus 77, 783–785 (1873), described the formation of lime borates by reaction of Iceland spar (calcite) with a saturated boric acid solution. The resultant salt was described as small needles of "a hydrated lime borate" which contains "$3BoO^2$, CaO and 4HO, which can be written as ($2BoO^2$, CaO, HO)($BoO^2$, 3HO)." Subsequently, Erd, McAllister and Vlisidis, *American Mineralogist*, 46, 560–571 (1961), suggested the Ditte product was nobleite. Erd et al. also synthesized nobleite by stirring CaO and boric acid in water for 30 hours at 48° C., and then holding the product at 68° C. for 10 days.

Kemp, *The Chemistry of Borates, Part I*, page 70 (1956), reported that an aqueous solution of boric acid kept at 40° C. for 3 weeks deposits a mixture of $CaO \cdot 3B_2O_3 \cdot 4H_2O$ and $2CaO \cdot 3B_2O_3 \cdot 9H_2O$. Kemp also reported that $CaO \cdot 3B_2O_3 \cdot 8H_2O$ decomposes to form $CaO \cdot 3B_2O_3 \cdot 4H_2O$. According to *Supplement to Mellor's Comprehensive Treatise on Inorganic and Theoretical Chemistry, Volume V, Part A: Boron-Oxygen Compounds*, pages 550–551 (1980), $CaO \cdot 3B_2O_3 \cdot 4H_2O$ occurs as a solid phase in the systems $Na_2O$—CaO—$B_2O_3$—$H_2O$ and CaO—NaCl—$B_2O_3$—$H_2O$ at 25° C. and pH 5.5–6.5. Hydrothermal treatment of meyerhofferite in boric acid solution at 85°–250° C. produced crystals of both the tetrahydrate and pentahydrate together with ginorite ($2CaO \cdot 7B_2O_3 \cdot 8H_2O$).

Mellor further reported that nobleite is a stable phase in the CaO—$B_2O_3$—$H_2O$ system at 25° C. and at 45° C. and is also formed from an aqueous mixture of lime (CaO) and boric acid at 60° C. Also, Mellor reports on page 551 that $CaO \cdot 3B_2O_3 \cdot 5H_2O$ (gowerite) is formed from lime and boric acid in aqueous media at 100° C.

Lehmann et al, *Zeitshrift füir Anorganische und Allgemeine Chemie*, Volume 346, pages 12–20, (1966), teach that the formation of gowerite from CaO, $H_3BO_3$ and water is favored by a relatively high temperature (100° C.), and higher CaO concentration, whereas nobleite formation is predominantly formed in more dilute solutions with lower CaO content and at lower temperature (60° C.).

Applicant's copending application Ser. No. 08/544,518 describes and claims a method for producing crystalline calcium hexaborate tetrahydrate by reaction of lime with boric acid in an aqueous slurry at a high temperature in the range of from about 85° to 105° C. The method results in a novel crystalline calcium hexaborate tetrahydrate composition having a distinctive crystal habit.

The present applicant has further found that the crystalline calcium hexaborate tetrahydrate can be produced at a somewhat lower temperature range provided that the final concentration of undissolved solids in the aqueous product is at a high level and the molar ratio of lime to boric acid ($CaO:H_3BO_3$) added is within specific limits. The resultant crystalline tetrahydrate product will generally have the desirable crystalline habit described in Applicant's copending application.

SUMMARY OF THE INVENTION

This invention provides an improved method for producing a crystalline calcium hexaborate tetrahydrate, by the reaction of boric acid and lime in an aqueous slurry at a temperature in the range of from about 60° to 85° C., wherein the molar ratio of boric acid to water ($H_3BO_3:H_2O$) is greater than about 0.25:1, the molar ratio of lime to boric acid ($CaO:H_3BO_3$) is in the range of from about 0.05 to about 0.15:1, and the reactants are present in a concentration sufficient to provide at least 25% by weight undissolved solids in the aqueous product slurry. The method of this invention results in a rapid reaction rate, high product yield and favorable product characteristics such as fine particle size distribution, with good flow and bulk handling properties. Further, there is provided a novel crystalline calcium hexaborate tetrahydrate composition having a distinctive crystal habit.

DETAILED DESCRIPTION OF THE INVENTION

The method of this invention comprises reacting high concentrations of boric acid and lime in water at elevated temperatures, in the range of from about 60° to about 85° C., to form crystalline calcium hexaborate tetrahydrate. The preferred reaction temperatures are at the elevated temperatures, and preferably in the range of from about 70° to about 85° C. A high concentration of undissolved solids in the reaction mixture is required, such as would provide at least 25% by weight undissolved solids in the final product slurry and preferably at least 30% by weight.

The concentration of the reactants is important to the production of calcium hexaborate tetrahydrate according to the process of this invention. In particular, a high ratio of boric acid to water in the reaction mixture will produce nobleite rather than gowerite at the elevated temperature conditions of this invention. Boric acid, which is highly soluble in water at high temperatures, should be added in quantities which are substantially greater than the solubility limit, in order to produce nobleite at these temperatures. The molar ratio of boric acid to water ($H_3BO_3:H_2O$) in the starting mixture should be greater than about 0.25:1, such as in the range of from about 0.25 to 0.5:1 and preferably in the range of from about 0.3 to 0.45:1. This is substantially higher than the solubility limit of boric acid at temperatures of 60° to 85° C. which ranges from about 0.04 to about 0.08 moles of $H_3BO_3$ per mole of water.

The molar ratio of lime to boric acid ($CaO:H_3BO_3$) in the starting mixture is in the range of from about 0.05 to 0.15:1, and preferably about 0.1 to 0.14:1. As used herein, lime includes calcium oxide such as burnt lime and quick lime, calcium hydroxide such as hydrated lime, slaked lime and lime hydrate, and calcium carbonate, including calcite and limestone.

The method of this invention may be used in producing calcium hexaborate tetrahydrate in a batch, continuous or semi-continuous process. In a batch process, the boric acid and lime may be combined in water and heated at the required temperature range to initiate the reaction. Alternatively, a mother liquor recycled from previous runs or freshly prepared mother liquor may be used as the reaction media. In a continuous or semi-continuous process, the desired product is continuously removed from the reaction vessel and the remaining mother liquor is recycled by adding additional boric acid and lime and heating the reactants at the reaction temperatures.

Generally the reaction is essentially complete within about one hour, although small improvements in the product $B_2O_3$ analysis may be attained by heating the reaction mixture for up to about 4 hours. When calcium oxide or calcium hydroxide are used as reactants, the reaction occurs as a noticeable exotherm within about 15 to 25 minutes, during which time the majority of the starting materials are converted to the desired product.

Preferably, the reaction mixture is agitated, such as by stirring, during the reaction period. Previously prepared nobleite seed crystals may be added to promote crystallization of the nobleite product. After the reaction is completed, the nobleite product is separated from the hot mother liquor such as by filtration or centrifugation or other suitable means of solid-liquid separation. The wet solids may be washed, such as with water, to remove any entrained mother liquor, and subsequently dried to provide a crystalline calcium hexaborate tetrahydrate.

If a product with higher $B_2O_3$ content is desired, the calcium borate tetrahydrate can be dehydrated by heating at a temperature of at least about 325° C., preferably in the range of about 450° C. to about 600° C. to produce a novel amorphous, anhydrous calcium hexaborate, $CaO \cdot 3B_2O_3$, which contains about 79% $B_2O_3$.

Particle size analysis of the crystalline product of this invention indicates a relatively small mean particle size distribution, typically of at least 90% smaller than 75 micrometers in diameter. This small mean particle diameter is advantageous for many applications where a fine dispersion of the solids is required, such as for fire retardant applications in polymeric resins. Yet at the preferred reaction temperature it is easy to filter, facilitating the separation of the solid product from the mother liquor, which then can be recycled back into the process. Further, the spherical shape of the crystal habit results in excellent handling and flow properties of the dried solids despite the extremely fine particle size distribution. It was also found that the crystalline product does not have a significant tendency toward caking.

The product dehydrates in three distinct stages, losing water at about 91°, 177° and 312° C. It was found to melt at a temperature of about 927° C. The anhydrous calcium borate product produced by dehydration of the product is less hygroscopic than most dehydrated metal borate compounds.

EXAMPLES

EXAMPLE 1

A 12-L flask was fitted with a reflux condenser, mechanical stirrer, and temperature controller. A mother liquor was prepared by charging the flask with 5 kilograms of deionized water, 1448 grams (23.42 moles) boric acid, and 31.7 grams (0.43 mole) calcium hydroxide. The mixture was heated to 80° C., and 1876 grams (30.34 moles) of boric acid, 417 grams (5.63 moles) of calcium hydroxide and 3 grams of synthetic nobleite seed were added. A second addition of 1876 grams of boric acid and 417 grams of calcium hydroxide was made to give a reaction slurry with a boric acid to water ($H_3BO_3:H_2O$) molar ratio of 0.30:1 and a lime to boric acid ($CaO:H_3BO_3$) molar ratio of 0.14:1. The amounts of reactants were calculated to yield a final product slurry containing about 36% by weight undissolved solids, assuming complete conversion of lime to a solid nobleite product. Reactant addition resulted in a temperature drop to 72° C., but continued heating led to a return to 80° C. within 9 minutes. After 20–25 minutes from reactant addition an exotherm occurred giving a temperature rise to 86° C. The mixture gradually returned to the control temperature of 80° C. where it was maintained with stirring. A chemical analysis of the solid phase yielded 61.2% $B_2O_3$ after a total of 165 minutes, indicating that the reaction was essentially complete. The reaction was allowed to stir overnight at 80° C. After 21 hours the product slurry was filtered, and the filtered solid was washed with water and air dried, resulting in a free flowing white powder. The crystalline product was determined to be nobleite by X-ray diffraction analysis. Chemical analysis indicated that the final product contained 62.3% $B_2O_3$. The product had a particle size distribution of 99% by weight passing a 100 mesh (150 micrometer) test sieve, 97% by weight passing a 200 mesh (75 micrometer) test sieve and 94% by weight passing a 325 mesh (45 micrometer) test sieve. The material appeared to have good flow properties, but tended to fluidize easily leading to bimodal flow behavior.

EXAMPLE 2

Boric acid (603.4 grams) and 13.2 grams of calcium hydroxide ($Ca(OH)_2$) were combined in 2,083.5 grams of deionized water in a stirred flask to make up a batch of synthetic mother liquor. This mixture was stirred and heated to 60° C. and two batches, each of 781.7 grams of boric acid and 173.8 grams of calcium hydroxide, were added to give a reaction slurry with a lime to boric acid ($CaO:H_3BO_3$) molar ratio of 0.14:1 and a boric acid to water ($H_3BO_3:H_2O$) molar ratio of 0.30:1, which was calculated to yield a final product slurry containing about 36% by weight undissolved nobleite solids. There was a slight drop in temperature after the addition of each batch of reactants. Approximately 3.0 grams of previously prepared synthetic nobleite was added as seed material after the final addition of boric acid and lime to promote crystallization of the nobleite product. A temperature increase to 63.1° C. was observed about 25 minutes after the addition of nobleite seed. The reaction mixture was stirred continuously with the temperature maintained at 60° C. for a period of 20 hours from the start of the test. At the conclusion of the 20 hour period the reaction slurry was filtered and the filter cake was washed with 1500 grams of deionized water to remove adhering liquor and then dried at about 60° C., for four days. The resultant crystalline product, which contained about 63.8% $B_2O_3$ and 16.1% CaO, was determined to be nobleite by X-ray diffraction analysis.

EXAMPLE 3

In 2,000 grams of water was combined 579.2 grams of boric acid and 17.1 grams of calcium carbonate (Atomite® $CaCO_3$ from ECC America Inc., mean particle size 3 μm) and the resultant mixture heated to 80° C. A mixture of 835.6 g boric acid and 225.3 g calcium carbonate was slowly added, causing the slurry to foam due to the release of carbon dioxide gas and to drop in temperature to 70° C. After the foaming had subsided and the temperature returned to 80° C. a second mixture of 835.6 g boric acid and 225.3 g calcium carbonate was added. The slurry was again reheated to and maintained at 80° C. The molar ratios of boric acid:water and lime:boric acid were 0.33:1 and 0.13:1, respectively. The reaction mixture was calculated to yield a final product slurry containing about 35% by weight undissolved nobleite solids. The reaction mixture was sampled after three hours and the entire batch was filtered and washed with deionized water after five hours, then dried at 60° C. for several days. The product was analyzed by titration and found to contain 63.4% by weight $B_2O_3$ after three hours and 64.1% $B_2O_3$ after five hours of reaction time. The final product was determined by X-ray diffraction to be nobleite.

EXAMPLE 4

The same procedure as example 3 was followed except that the reaction was carried out at 60° C. instead of 80° and the batch size was reduced by 25% to accommodate the foaming caused by the evolution of carbon dioxide gas. As in example 3, the molar ratios of boric acid:water and lime:boric acid were 0.31:1 and 0.14:1, respectively, to yield a calculated final product slurry containing about 35% by weight undissolved nobleite solids. The reaction mixture became very thick after three hours. It was allowed to stir overnight and became so thick during this time that it appeared to be stirring only in the center of the reaction mixture. Two liters of deionized water at 60° C. were added in order to thin the slurry before attempting to filter the mixture. However, the product was very difficult to filter and appeared to contain very fine particulate solids. The solid product was analyzed by X-ray diffraction and determined to be nobleite. Evaluation of the product by scanning electron microscopy indicated that the nobleite had formed as hexagonal platelets, as with the higher temperature reactions described in copending application Ser. No. 08/544,518, however the unique morphology described therein, wherein the platelets form as spherical radial clusters at higher temperature, was largely absent as many of the platelets were unattached. The product was analyzed by titration and found to contain about 62.3% by weight $B_2O_3$.

EXAMPLES 5-6

Reactions were carried out at 75° C. and at lower boric acid:water ratios (and therefore lower final solids concentrations) using calcium hydroxide as the source of lime. In example 5, boric acid (1,448 grams) and 31.7 grams of calcium hydroxide were combined with 5 liters of deionized water and heated to 75° C. An additional 1,506 grams of boric acid and 300.7 grams of calcium hydroxide were added. The molar ratios of boric acid:water and lime:boric acid were 0.17:1 and 0.09:1, respectively. The mixture was calculated to yield a final product slurry containing about 18% by weight undissolved solids, assuming complete conversion of lime to a solid nobleite product. After 45 minutes a crop of particles was observed. After three hours the reaction mixture was sampled and then diluted to 50% with warm water and filtered. The filter cake was washed with about 3 liters of deionized water to remove adhering liquor. The solid product was analyzed by titration and found to contain 61.8% by weight $B_2O_3$. The product was determined to consist of nobleite with an estimated 7% gowerite based on X-ray diffraction analysis.

Example 6 was similar to example 5, except it was run at a much lower boric acid concentration. In example 6, boric acid (1321 grams) and 20 grams of calcium hydroxide were combined with 6,419 grams of deionized water and heated to 75° C. An additional 100 grams of boric acid and 140 grams of calcium hydroxide were added. The molar ratios of boric acid:water and lime:boric acid were 0.06:1 and 0.09:1, respectively. The mixture was calculated to yield a final product slurry containing about 9% by weight undissolved solids, assuming complete conversion of lime to a solid nobleite product. After three hours the reaction mixture was sampled and filtered. The solid product was found to contain a poorly crystallized mixture of nobleite and gowerite. The product was analyzed by titration and found to contain only 46.5% by weight $B_2O_3$.

Various changes and modifications of the invention can be made and, to the extent that such variations incorporate the spirit of this invention, they are intended to be included within the scope of the appended claims.

What is claimed is:

1. The method of producing crystalline calcium hexaborate tetrahydrate which comprises reacting boric acid and lime in an aqueous slurry, at a temperature in the range of from about 60° to about 85° C., wherein the molar ratio of boric acid to water is greater than about 0.25:1 and the molar ratio of lime to boric acid is in the range of about 0.05 to about 0.15:1, wherein said reactants are present in a concentration sufficient to provide at least 25% by weight undissolved solids in the aqueous product slurry, and separating said crystalline calcium hexaborate tetrahydrate from said aqueous product slurry.

2. The method according to claim 1, wherein said molar ratio of boric acid to water is in the range of from about 0.3 to about 0.45:1.

3. The method according to claim 1, wherein said molar ratio of lime to boric acid is in the range of from about 0.1 to about 0.14:1.

4. The method according to claim 1, wherein said temperature is in the range of from about 70° to about 85° C.

5. The method according to claim 1, wherein said lime is calcium carbonate.

6. The method according to claim 1, wherein said lime is hydrated lime.

7. The method according to claim 1, wherein the concentration of undissolved solids in said aqueous product slurry is at least about 30% by weight.

8. The method of producing crystalline calcium hexaborate tetrahydrate which comprises reacting boric acid and lime in an aqueous slurry, at a temperature in the range of from about 70° to about 85° C., wherein the molar ratio of boric acid to water is in the range of from about 0.3 to about 0.45:1, the molar ratio of lime to boric acid is in the range of from about 0.1 to about 0.14:1 and the concentration of reactants provides at least 30% by weight undissolved solids in the aqueous product slurry, and separating said crystalline calcium hexaborate tetrahydrate from said slurry.

9. A crystalline calcium hexaborate tetrahydrate composition produced according to the method of claim 1.

10. A crystalline calcium hexaborate tetrahydrate composition produced according to the method of claim 8.

11. The method of dehydrating a crystalline calcium hexaborate tetrahydrate composition produced according to claim 1 wherein said composition is heated at a temperature above about 325° C.

12. The method according to claim 11 wherein said temperature is in the range of from about 450° C. to about 600° C.

13. An amorphous calcium hexaborate composition produced according to the method of claim 11.

* * * * *